(12) United States Patent
Godsall et al.

(10) Patent No.: US 10,138,859 B2
(45) Date of Patent: Nov. 27, 2018

(54) HEATER AND METHOD OF OPERATION THEREFOR

(71) Applicant: Jaguar Land Rover Limited

(72) Inventors: Colin Godsall, Solihull (GB); Dominic Taylor, Birmingham (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 913 days.

(21) Appl. No.: 14/378,451

(22) PCT Filed: Feb. 13, 2013

(86) PCT No.: PCT/EP2013/052854
§ 371 (c)(1),
(2) Date: Aug. 13, 2014

(87) PCT Pub. No.: WO2013/120887
PCT Pub. Date: Aug. 22, 2013

(65) Prior Publication Data
US 2016/0025059 A1 Jan. 28, 2016

(30) Foreign Application Priority Data
Feb. 13, 2012 (GB) .................................. 1202429.5

(51) Int. Cl.
*F02N 19/10* (2010.01)
*B60H 1/22* (2006.01)
(Continued)

(52) U.S. Cl.
CPC ........... *F02N 19/10* (2013.01); *B60H 1/2206* (2013.01); *F23N 5/022* (2013.01); *F23N 5/242* (2013.01); *B60H 1/2209* (2013.01); *B60H 2001/2234* (2013.01); *F02N 2200/023* (2013.01); *F02N 2200/122* (2013.01); *F23N 2025/13* (2013.01); *F23N 2025/14* (2013.01);
(Continued)

(58) Field of Classification Search
CPC ................ B60H 1/2206; B60H 1/2209; F02N 2200/024; F02N 19/10; F02N 19/04
See application file for complete search history.

(56) References Cited

U.S. PATENT DOCUMENTS 2,419,634 A * 4/1947 Dykeman ............... F16N 39/02
165/159
3,626,148 A 12/1971 Woytowich et al.
(Continued)

FOREIGN PATENT DOCUMENTS

DE 19605323 C1 2/1997
DE 19924329 9/2000
(Continued)

OTHER PUBLICATIONS

Chinese Search Report corresponding to CN application No. 201380009287.8, dated Nov. 12, 2015, 4 pages.
(Continued)

*Primary Examiner* — Kenneth Rinehart
*Assistant Examiner* — Deepak Deean
(74) *Attorney, Agent, or Firm* — Reising Ethington P.C.

(57) ABSTRACT

A heater system for preheating a vehicle and method of operating the same, wherein the method of operation is dependent upon the temperature of the coolant fluid in the vehicle coolant system.

21 Claims, 5 Drawing Sheets

(51) Int. Cl.
*F23N 5/02* (2006.01)
*F23N 5/24* (2006.01)

(52) U.S. Cl.
CPC ...... *F23N 2025/18* (2013.01); *F23N 2027/02* (2013.01); *F23N 2041/14* (2013.01)

(56) References Cited

U.S. PATENT DOCUMENTS

| | | | | |
|---|---|---|---|---|
| 4,411,385 A * | 10/1983 | Lamkewitz | ........... | B60H 1/2206 236/91 B |
| 4,645,450 A * | 2/1987 | West | ........... | F23N 1/022 431/12 |
| 4,706,644 A * | 11/1987 | Nakai | ........... | B60H 1/032 122/20 B |
| 4,770,134 A | 9/1988 | Foreman et al. | | |
| 4,836,444 A * | 6/1989 | Kawamura | ........... | B60H 1/2206 237/12.3 C |
| 5,063,513 A * | 11/1991 | Shank | ........... | B60H 1/2206 123/142.5 E |
| 5,878,950 A * | 3/1999 | Faccone | ........... | B60H 1/2206 236/91 F |
| 5,894,834 A | 4/1999 | Kim | | |
| 5,894,988 A | 4/1999 | Brenner | | |
| 6,082,625 A * | 7/2000 | Faccone | ........... | B60H 1/032 237/12.3 C |
| 6,779,737 B2 * | 8/2004 | Murray | ........... | B60H 1/00314 237/12.3 R |
| 7,077,224 B2 * | 7/2006 | Tomatsuri | ........... | B60K 3/00 123/142.5 R |
| 8,608,619 B2 * | 12/2013 | Wakayama | ........... | F02D 29/02 477/98 |
| 8,740,104 B2 * | 6/2014 | Bigler | ........... | B60H 1/06 180/65.275 |
| 9,375,994 B2 * | 6/2016 | Eisenhour | ........... | B60H 1/2218 |
| 2003/0183184 A1 * | 10/2003 | Murray | ........... | B60H 1/00314 123/142.5 R |
| 2012/0037336 A1 * | 2/2012 | Ishikawa | ........... | B60H 1/00314 165/51 |

FOREIGN PATENT DOCUMENTS

| | | |
|---|---|---|
| DE | 10007195 | 9/2001 |
| DE | 102005050862 | 5/2007 |
| EP | 0892215 | 1/1999 |
| EP | 1936274 | 6/2008 |
| EP | 1992507 | 11/2008 |
| GB | 1552920 | 9/1979 |
| JP | 54151234 A | 11/1979 |
| JP | 61291211 A | 12/1986 |
| JP | 02119606 A | 5/1990 |
| JP | 2002089668 A | 3/2002 |
| WO | 2010128547 A1 | 11/2010 |

OTHER PUBLICATIONS

Chinese Office Action corresponding to CN application No. 201380009287.8, dated Nov. 20, 2015, 16 pages.
International Search Report for application No. PCT/EP2013/052854, dated Aug. 5, 2013, 7 pages.
Written Opinion for application No. PCT/EP2013/052854, dated Feb. 8, 2013, 6 pages.
Great Britain Search Report for corresponding application No. GB1202429.5, dated Jun. 13, 2012, 9 pages.
Great Britain Search Report for corresponding application No. GB1202429.5, dated Jan. 30, 2013, 6 pages.

* cited by examiner

HEATER AND METHOD OF OPERATION THEREFOR

TECHNICAL FIELD

The present invention relates to a heater system and a method of operation therefor and more particularly, but not exclusively, to a method of operation of a heater system in extreme cold conditions. Aspects of the invention relate to a heater system, to a control system, to a vehicle and to a method.

BACKGROUND

In cold conditions the viscosity of liquids such as engine coolant increases, in such conditions it may be necessary to increase the temperature of an internal combustion engine, for example of a vehicle, prior to starting the engine in order to efficiently start the engine, and/or it may be desirable to preheat the passenger cabin of a vehicle. Preheating the passenger cabin can be achieved using the Healing Ventilating and Air-Conditioning system (HEVAC); preheating the engine can be achieved by heating the engine coolant, normally used to cool the engine, and pumping this 'warmed' or 'heated' coolant through a fluidic circuit in the coolant system of the vehicle such that heat is transferred to the engine components. A fuel operated heater may be provided to heat the coolant; fuel normally used to power the combustion engine of the vehicle is ignited to produce heat which is transferred to the coolant. Typically an auxiliary coolant pump is used to pump the coolant about the fluidic circuit of the engine and the HEVAC when the vehicle's engine is not running; such auxiliary coolant pumps are typically less powerful than the normal coolant pump, used when the engine is running. This is due to the limited power reserves available when the engine is off, for example only power from the vehicle's battery may be available.

In extreme cold conditions, for example below −30° C., the increase in viscosity of the coolant can reduce the flow rate of the coolant when pumping the coolant about the fluidic circuit with the auxiliary coolant pump. The flow rate can be reduced to a point at which the system is unable to dissipate the heat generated by the fuel operated heater, this can lead to localised 'boiling' or overheating of the coolant in the region of heat transfer. Such overheating can be defected and may lead to generation of a fault code and/or render the fuel operated heater and/or vehicle inoperative, either to prevent damage to the heat exchanger or the pump or as a consequence of damage caused. Such problems can become exacerbated as the coolant temperature approaches or exceeds around −40° C.

It is therefore an aim of the present invention to overcome or at least mitigate the aforementioned problem. Other aims and advantages will become apparent form the following description and drawings.

The present invention seeks to provide an improvement in the field of fuel operated heaters which have particular application in vehicles. The invention may be utilised in applications other than for vehicles, for example it is foreseen that the invention may have application in generators, in particular portable generators, or other applications requiring an internal combustion engine.

SUMMARY

Aspects of the invention relate to a heater system, a control system, heater apparatus, a controller, a vehicle and to a method as claimed in the appended claims.

According to one aspect of the invention for which protection is sought, there is provided a method of operating a heater for preheating vehicle components via fluid in a heat exchanger, the method comprising receiving a wake signal to commence heating, determining the value of a parameter indicative of the flow capability of a fluid to be heated, determining a start-up sequence of the heater based upon the determined parameter value, and initiating the selected start-up sequence to commence heating of the fluid.

This has the advantage of overcoming or at least mitigating against the possibility of the coolant fluid overheating in the region of heat transfer in the heater when operated at low temperatures.

Optionally, the method comprises selecting a start-up sequence from at least two start-up sequences, the at least two start-up sequences comprising a first start-up sequence for use when the determined value of the parameter is indicative that the flew capability of a fluid to be heated is below a predetermined threshold value and a second start-up sequence for use when the determined value of the parameter is indicative that the flow capability of a fluid to be heated is above a predetermined threshold value.

Optionally, the first sequence enables the heater to be operated such that heat is transferred to the fluid at a lower average rate, for at least an initial period, than when operated in the second sequence.

Optionally, the first sequence enables the heater to be operated such that neat is transferred to the fluid such that flow capability of the fluid is reduced, without overheating of the fluid.

Optionally, the first sequence enables the flow capability of the fluid to be reduced, during the initial period, such that afterwards the rate of heat transfer may be increased without overheating of the fluid.

Optionally, the threshold value is indicative of the fluid's flow capability at which overheating of the fluid is likely to occur if the fluid is heated using the second sequence for the heater.

Optionally, in both the first sequence and the second sequence the heater generates a lower rate of heat output for a preliminary period, after which the rate of heat output is increased, the preliminary period being longer in the first start-up sequence than that provided in the second sequence.

Optionally, the heater is a fuel operated heater comprising a fuel pomp the method comprising: pumping, fuel to the fuel operated heater at different flow rates in each of the at least two sequences.

In some embodiments the measurement of the property indicative of the flow capability of the fluid to be heated includes at least one of the following:
measuring the temperature of a fluid to be heated; and/or
measuring the temperature of ambient air; and/or
measuring the viscosity of the fluid.

Optionally, in the first or second start-up sequence the heater generates and/or transfers heat at a rate which is sufficiently low to prevent overheating the fluid, in the region of the healer where heat is transferred to the fluid.

In some embodiments the method comprises receiving an error code and selecting another of the at least two start-up sequences.

The method may comprise pumping the fluid about a fluidic circuit and transferring heat in the fluid to a component forming part of the fluidic circuit.

Optionally, the method comprises changing the condition of a valve in the fluidic circuit, thereby adjusting the path followed by the fluid.

This has the advantage of changing the vehicle components to which heat is transferred, optionally directing the heat generated by the heater to those vehicle components where it is most needed or desired.

According to another aspect of the invention for which protection is sought, there is provided a heater system for a vehicle, the system comprising a heater;
a fluidic circuit for coupling the heater to an internal combustion engine;
a fluid within the fluidic circuit;
a pump for pumping the fluid about the fluidic circuit;
a sensor for measuring a property indicative of the flow capability of the fluid in the fluidic circuit;
wherein the heater is arranged to be operated in one of at least two modes of operation dependent upon the value of the measured property of the fluid.

In some embodiments the heater comprises a fuel pump in fluidic connection to a fuel tank, the fuel pump being capable of delivering fuel to the heater at two or more different rates.

This has the advantage of enabling the heater to produce heat at different rates such that the coolant fluid can be heated rapidly or slowly.

Optionally, the system further comprises a HEVAC system for a vehicle in fluidic connection with the heater for preheating the passenger cabin of a vehicle.

Optionally, the system further comprises at least one valve for adjusting the fluidic path in the fluidic circuit thereby allowing the fluid to bypass one of the HEVAC system or the internal combustion engine so as to provide heat to the other of the HEVAC system or internal combustion engine, the state of the valve being dependent upon the temperature measurement of the fluid.

Optionally, the at least one valve is used to adjust the fluidic path so that above a threshold temperature, the fluid bypasses the engine but includes the HEVAC system, and below the threshold temperature, the fluidic path includes the engine in addition to the HEVAC system.

Optionally, the sensor is a temperature sensor for determining the temperature of the fluid in the fluidic circuit.

In some embodiments the temperature sensor sends a signal indicating overheating of the fluid.

The system may comprise a control unit for receiving an initiation signal from a user and instructing the system to commence heating the fluid.

According to a further aspect of the present invention, there is provided a heater; a fluidic circuit for coupling the heater to an internal combustion engine; a fluid within the fluidic circuit; a pump for pumping, the fluid about the fluidic circuit; a sensor for measuring a property indicative of the flow capability of the fluid in the fluidic circuit; wherein the heater is arranged to be operated in one of at least two modes of operation dependent upon the value of the measured property of the fluid.

According to another aspect of the invention for which protection is sought, there is provided a heater apparatus for heating a fluid comprising: a heat exchanger for transferring heat to a fluid; a controller for selecting a heating profile sequence of the heater based upon a signal received by the controller, which signal is indicative of the flow capability of the fluid, the controller implementing a heating profile sequence which heating profile sequence is dependent upon the flow capability of the fluid being heated.

According to a further aspect of the invention for which protection is sought, there is provided a heater apparatus comprising:
a fuel source;
a air source;
a combustion chamber for mixing the fuel and air;
a heat source for inducing combustion of the fuel/air mixture;
a heat exchanger for transferring heat to a fluid;
a controller for controlling a fuel pump,
wherein the controller comprises a processor for executing a computer program stored in a memory location, the computer program comprising at least two algorithms for controlling a start-up sequence of the heater, a first one of said at least two algorithms being executed when the controller receives a first signal indicative that the viscosity of the fluid is above a threshold value, a second one of said at least two algorithms being executed when the controller receives a second signal indicative that the viscosity of the fluid is below a threshold value or in the absence of receipt of the first signal.

According to slid another aspect of the invention for which protection is sought, there is provided a controller for controlling a fuel pump, comprising a processor for executing a computer program stored in a memory location, the computer program comprising at least two algorithms for controlling a start-up sequence of the heater, a first one of said at least two algorithms being executed when the controller receives a first signal indicative that the viscosity of the fluid is above a threshold value, a second one of said at least two algorithms being executed when the controller receives a second signal indicative that the viscosity of the fluid is below a threshold value or in the absence of receipt of the first signal.

According to a yet further aspect of the invention for which protection is sought, there is provided a control system for a heater system comprising a computer program for carrying out the method described hereinabove.

According to another aspect of the invention for which protection is sought there is provided a method for operating a heater comprising:
receiving a wake signal to commence heating;
selecting a first heating profile sequence of the heater from one of a plurality of heating profile sequences;
initiating the first heating profile sequence to commence heating of the fluid;
receiving a signal indicating that the fluid temperature is above a predefined value such that the fluid is being overheated or will be overheated;
selecting a second, different, heating profile sequence of the heater; and
initiating the second heating profile sequence to heat the fluid.

Optionally, in the second sequence the heater is operated such that heat is transferred to the fluid at a lower average rate for at least an initial period than when the heater is operated according to the first sequence.

Optionally, in the second sequence the heater is operated so that heat is transferred to the fluid such that the flow capability of the fluid is increased, without overheating of the fluid.

Preferably, when in the second sequence the heater is operated so that the flow capability of the fluid is increased, during the initial period, such that afterwards the rate of heat transfer may be increased without overheating of the fluid.

Optionally, in the second sequence the heater is operated so that heat is transferred to the fluid at a rate which is sufficiently low to prevent overheating of the fluid, in the region of the heater where heat transfers to the fluid.

In the second sequence, the healer may generate a lower rate of heat output for a preliminary period which period is longer than that provided in the first sequence.

Optionally, the method according to any preceding claim wherein the heater is a fuel operated heater comprising a fuel pump, the method comprising pumping fuel to the fuel operated heater at a lower average flow rate in the second sequence than in the first sequence.

According to yet another aspect of the invention for which protection is sought, there is provided a method for operating a heater comprising:

receiving a wake signal to commence heating;
measuring the temperature of a fluid to be heated;
determining a start-up sequence for the heater based upon the temperature measurement, and
initiating the selected start-up sequence to commence heating of the fluid.

Alternatively to measuring the temperature of the fluid to be heated or additionally thereto, the method includes measuring the temperature of the ambient air and/or measuring the viscosity of the fluid to be heated and/or receiving an error code indicative of overheating of the fluid.

According to still a further aspect of the invention for which protection is sought, there is provided an information storage medium comprising a computer program for carrying out the methods of operating a heater described hereinabove.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Detailed descriptions of specific embodiments of the fuel operated heater system of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the fuel operated heater system described herein may be embodied in various and alternative forms. The figures are not necessarily to scale and some features, may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
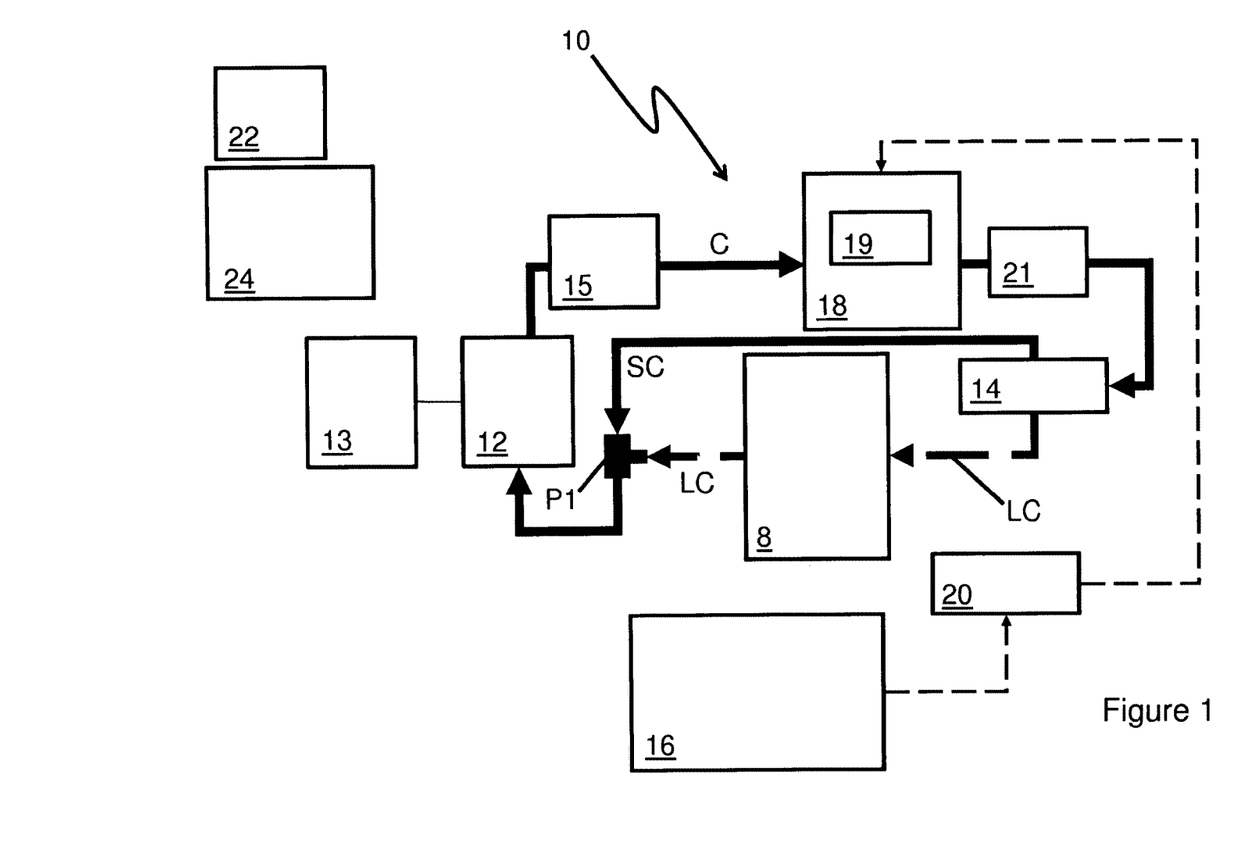
FIG. 1 is a schematic illustration of a fuel operated heater system for a vehicle according to an embodiment of the invention.

Referring to FIG. 1 there is shown a schematic view of a fuel operated heater system 10 for a vehicle. A fuel operated heater 18 is fluidically coupled to an internal combustion engine 8 and to a vehicle HEVAC system 12, by a fluidic circuit C. The engine 8 comprises a coolant system comprising a coolant fluid. The HEVAC system 12 comprises a HEVAC heat exchanger (not shown) for transferring heat from the engine's coolant system to a passenger cabin (not shown). Heat extracted from the coolant fluid in the coolant system is used to heat ambient air, which heated air is blown into the vehicle's passenger cabin using an air blower or fan.

A valve 14 is provided such that the coolant fluid may be directed through the engine 8 and through the HEVAC system 12 or may be directed through the HEVAC system 12 only. The state of the valve 14 is dependent upon the temperature of the coolant fluid. The fuel operated heater 18 is fluidically coupled to a fuel tank 16 by a fuel pump 20. The fuel tank 16 is the fuel tank used to store fuel for the combustion engine 8. In alternative embodiments the system comprises a separate fuel tank dedicated to the fuel operated heater 18; in some of these embodiments the fuel being burnt by the fuel operated heater 18 is different to the fuel burnt by the combustion engine 8.

An auxiliary coolant pump 15 is provided as pap of a module including the fuel operated heater 18 or the HEVAC system 12 or as a standalone unit. The auxiliary coolant pump 15 is operational when the combustion engine 8 is not being operated.

The fuel operated heater 18 may also comprise a motor, for example an electric motor, for driving a fan or impeller for delivering combustion air to a combustion chamber; which combustion air is mixed with fuel in the combustion chamber. The fuel operated heater 18 also comprises a heat source such as a glow plug to induce combustion. The heat provided by the glow plug vaporises the fuel delivered into the combustion chamber. Once the fuel air mixture in the combustion chamber reaches the required temperature the fuel/air mixture will ignite. A heat exchanger 19 is provided in the fuel operated heater to transfer heat from the combustion chamber to the coolant fluid in the coolant system. The 'heated' coolant fluid is transferred or pumped about the system 10 by the auxiliary coolant pump 15.

The system 10 comprises a control unit 13 coupled to human interface (HI) module 24 the HI module 24 may form part of an infotainment system. The HI module 24 may be coupled to the fuel operated heater 18 by a wired connection or wireless connection via the control unit 13 or directly thereto. The control unit 13 controls the fuel operated healer 18 and may be integrated within a unitary module including the fuel operated heater 18 or may be a standalone unit coupled to the fuel operated heater 18.

The system 10 may also comprise an electronic key fob or electronic smart key 22 having a preheat function. The key fob 22 may communicate wirelessly with the control unit 13 or the HI module 24 or directly with the fuel operated heater 18.

A user may input or send instructions to the system 10 via the HI module 24 or the key fob 22. Such instructions may be pre-programmed or set by the user to preheat the vehicle at a specific time or upon demand.

Figure 4:
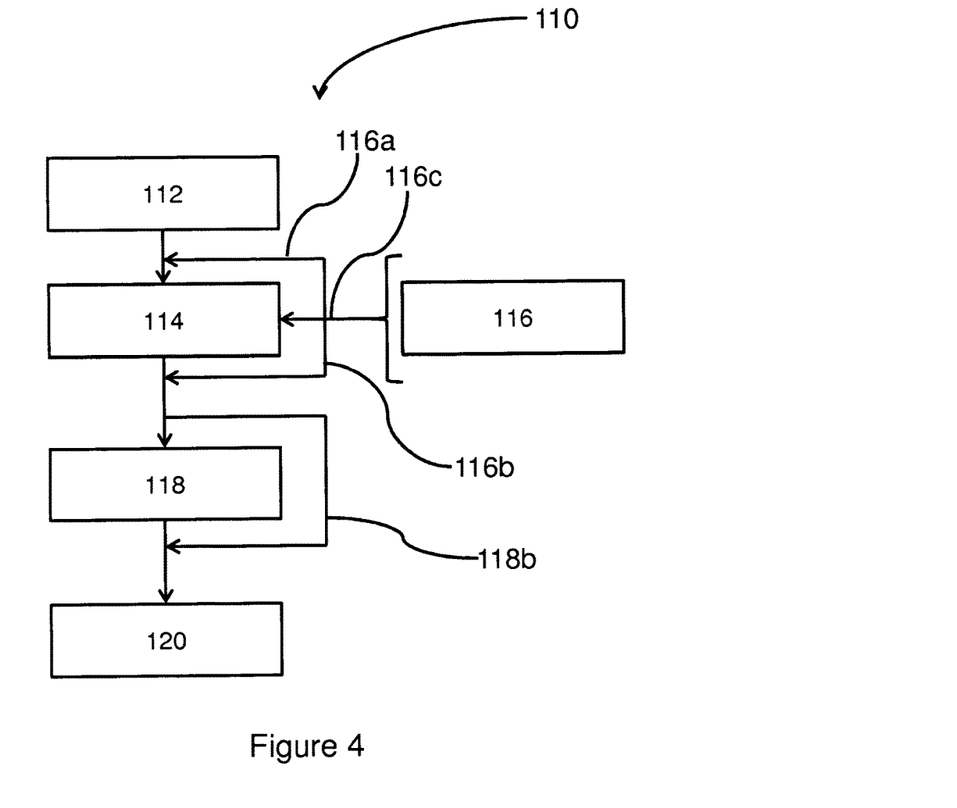
FIG. 4 is a flow diagram of a method of operating a heater system according to an embodiment of the invention.

When the system 10 is in use a 'wake', initiation, or preheat signal is sent from the HI module 24 or the key fob 22 to the HEVAC system 12 or the control unit 13, demanding that the system commence pre heating the vehicle. FIG. 4 shows a flow diagram of a method 110 of operating a heater according to an embodiment of the present invention. Step 112 represents the step of receiving the wake/preheat signal.

Upon receipt of the preheat signal from the HI module 24 or key fob 22 or the control unit 13, the HEVAC system 12 will relay the preheat signal to the fuel operated heater 18. In some embodiments it is envisaged that the preheat signal may be transmitted directly to the fuel operated heater from the HI module 24 or key fob 22 or the control unit 13. Therefore, in some embodiments, the heater system will commence heating at step 114.

A temperature sensor 21 measures, or estimates, the temperature of the coolant fluid. The system 10 may additionally make other measurements for example the ambient air temperature, oil temperature, cabin temperature. In some embodiments the temperature sensor 21 may measure the coolant fluid's temperature directly, or it may infer or estimate the coolant fluid's temperature based upon an alternative measurement, for example a temperature measurement of the ambient air. In yet other embodiments the system may measure the viscosity of the coolant fluid in addition to, or alternative to, measuring the coolant fluid temperature. All the above temperature or viscosity measurements may be considered to be measurements of properties indicative of the viscosity or flew capability of the cooling fluid, in further alternative embodiments, measurement made may be of the work load placed upon the auxiliary coolant pump 15 when pumping the fluid, for example the system 10 may measure the current drawn by the auxiliary coolant pump 15. Therefore, one or more of the sensors may be used to determine a parameter value indicative of the flow capability of the fluid to be heated. The step of determining the parameter value 118 may be performed before 116a, after 116b, or simultaneously with 116c the step of commencing heating 114.

In all instances where preheating of the cabin and/or engine is required, the following procedure applies. Once the fuel operated heater 18 is initiated, an electrical current is passed through the glow plug so as to generate heat. The fuel pump 20 delivers fuel from the fuel tank 18 to the combustion chamber of the fuel operated heater 18, and ambient air is drawn into or pumped into the combustion chamber using a fan or impeller. The fuel delivered to the combustion chamber vaporises due to the heat provided by the glow plug to form a combustible fuel/air mixture with the ambient air drawn into the combustion chamber.

The fuel/air mixture ignites when the required temperature is reached. Hot combustion gases flow through the heat exchanger 19 and into an exhaust system. Heat from the combustion gases is transferred in the heat exchanger 19 to the coolant fluid.

The preheating procedure 114 followed by the system 10 will optionally be dependent upon the result of the coolant fluid's temperature measurement $T_e$, as measured by the temperature sensor 21. If $T_e$ is within region 30 in FIG. 2, i.e. is above around a first threshold temperature $T_e1$ (in the embodiment of FIG. 2 $T_e1$ is −20° C.), a first procedure is followed. If $T_e$ is within region 40, i.e. between approximately −20° C. and approximately −30° C., then a second procedure will be applied. If $T_e$ is within region 50, i.e. below approximately −30° C., then a third procedure will be applied.

In the first procedure, or the control unit 13 closes the valve 14 so as to create a short fluidic circuit, SC, bypassing the engine 8. After passing through the heat exchanger 19 of the fuel operated heater 18, the coolant fluid is pumped about the short fluidic circuit SC of the system 10 so as to pass through the HEVAC system 12 where the heat is transferred to the cabin by the HEVAC heat exchanger and the air blower in the HEVAC system 12. Therefore, in this configuration only the cabin is preheated, the engine components are not preheated since the heated coolant fluid does not pass through the engine 8.

It will be noted that above an upper temperature threshold of around 15° C., preheating of the vehicle cabin may not be necessary or desirable. The upper temperature threshold may be user defined. Therefore, the first procedure will essentially only apply up to the upper temperature threshold, as there will be no preheating at all required above the upper temperature threshold.

In the second and third procedures, the HEVAC system 12 opens the valve 14 so as to create a long fluidic circuit LC, including both the engine 8 and the HEVAC system 12. This provides that the system 10 conveys heat about the fluidic circuit to both, the engine 8 and the HEVAC system 12 and which heat is transferred to both the engine 8 and the HEVAC system 12 enabling efficient starting of the engine and preheating of the passenger cabin to improve passenger comfort.

In addition to the differences in the fluid circuit in the different procedures, there are also differences in the start-up operation of the fuel burning heater, as follows.

In the first and second procedures, when the fuel operated heater 18 is initiated, it is started in a first mode, start-up sequence or heating profile which is a high heat output or rapid heat mode, in the third procedure, when the fuel operated heater 18 is initiated, it is started in a second mode, start-up sequence or heating profits which is a low heat output or slow heat mode.

Figure 2:
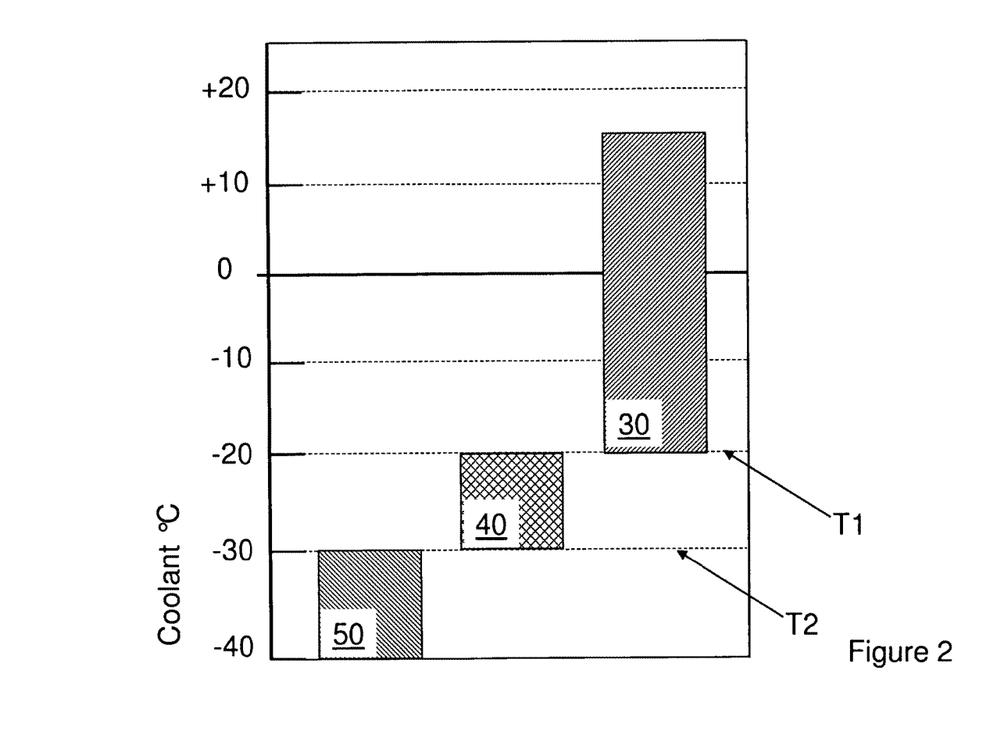
FIG. 2 is a graph illustrating the typical temperatures ranges over which each of the operational modes of the fuel operated heater system of FIG. 1 are operated with respect to the coolant temperature.

The threshold $T_e$ temperature, $T_e2$, between the region 40 and the region 50 in FIG. 2, and hence between use of the first mode and use of the second mode, is the temperature at which the temperature of the coolant fluid is sufficiently low such that if indicates the corresponding viscosity of the coolant fluid, may lead to overheating if the heating was carried out in the first mode on initiation of the fuel operated heater 18. Overheating occurs because the flow of the fluid is so slow that the fluid spends a long period of time in the zone in which heat is transferred from the heater.

In this embodiment $T_e2$ is −30° C. The skilled person would appreciate that the temperature at which the viscosity of the fluid is such that flow of the fluid is low enough that local overheating occurs may be dependent on a number of factors, such as the type of cooling fluid, the geometry of the heat exchanger, the area of the cooling fluid circuit which is in immediate contact with the heat source, and the heating profile of the first mode. The skilled person would appreciate that $T_e2$ would need to be set accordingly.

In the low heat or slow heat mode, the rate of heat transfer to the fluid is reduced. At the low temperatures in which the low heat or slow heat mode is implemented the auxiliary coolant pump is less effective, lower fluid flow rate, than when being operated at higher temperatures. The auxiliary coolant pump is less effective due to the increase in viscosity of the fluid, and therefore the fluid which is being pumped by the auxiliary coolant pump remains in the heat exchanger for a longer period of time than when being operated at higher temperatures. Since the fluid remains in the heat exchanger for a longer period of time, during which heat is transferred to the fluid, it is necessary to reduce the rate of heat transfer to the fluid to prevent overheating of the fluid.

At temperatures below temperature $T_e2$ the viscosity of the fluid has a increased sufficiently that the fluid may be remain within the heat exchanger for a sufficiently long period of time such that if heated at the rate used in the first mode the fluid may be overheated or "boil". Therefore by reducing the heat output in the second mode of operation of the fuel operated heater the risk of overheating the fluid is reduced since fluid may be pumped through the heat exchanger before being overheated. Additionally, the heat transferred to the fluid may be transmitted away from the heat exchanger, for example by conduction or convection, and hence away from the portion of cooling fluid being heated, throughout all the cooling fluid.

This prevents local overheating of the cooling fluid at the immediate portion of the cooling fluid being heated. Therefore, an error state of the system is prevented, and the cooling fluid can be heated sufficiently such that the viscosity decreases to a level to allow flow of the cooling fluid about the cooling circuit, allowing effective preheating for the vehicle.

The manner in which different heat outputs are achieved in the first and second mode will now be explained in more detail.

Figure 3:
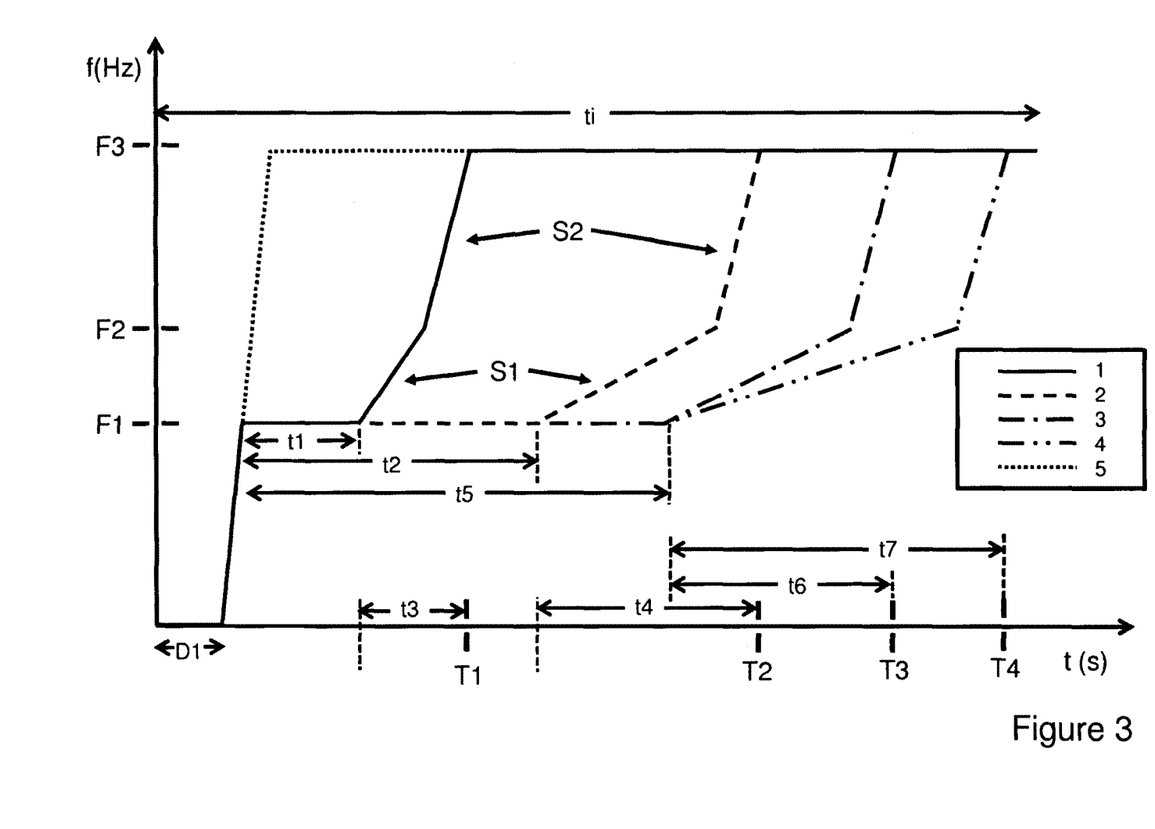
FIG. 3 is a graph illustrating different, operational modes of a fuel pump of the fuel operated healer system of FIG. 1.

FIG. 3 illustrates a graph of pumping frequency of the fuel pump 20 against time over an initial period commencing with receipt of a wake signal.

When the system 10 receives an 'initiation' or 'wake' signal, in both the first mode and the second mode, the pump frequency increases from $0H_z$ (off), after a shod delay D1, to a first pumping frequency F1. The fuel pump 20 operates for a period at frequency F1 and thereafter the pump frequency increases to and is maintained at a pumping frequency F3. The greater pumping frequency at F3 results in a higher rate of production of combustion gases and hence the heat output will be greater at the pumping frequency F3 than the pumping frequency F1.

In the first, high output, mode, the fuel pump 20 operates at the pumping frequency profile indicated by solid line 1. The fuel pump 20 reaches frequency F3 at time T1 in the first mode.

In this embodiment in both the first mode and the second mode, the rate at which the pump frequency increases from frequency F1 to frequency F3 comprises two stages, in the first stage, S1, the frequency increases at first rate, having a first gradient, to a frequency F2. In the second stage, S2, the frequency increases to F3 at a second rate, which second rate is faster than the first rate, and hence has a steeper gradient than the first rate in FIG. 3.

The skilled person will appreciate that in alternative embodiments the pump frequency may increase at a constant rate from frequency F1 to frequency F3, for either or both the first mode and the second mode. In such a case there would be no change in gradient between frequency F1 and frequency F3.

Further, in an another embodiment, in the first mode of operation the pump frequency may be ramped directly up to the high frequency F3 as indicated by dashed line 5. The fuel pump 20 reaches frequency F3 before time T1 in this alternative embodiment.

In the second mode, a lower heat output is achieved by producing a lower average flow rate of combustion gases through the heat exchanger over an initial period ti, so that there is less heat to be transferred to the cooling fluid per unit time. The lower rate of flow of combustion gases is achieved in this embodiment by two differences in the pumping frequency profile compared with that of the first mode (the pumping frequency profile in the second mode is indicated by dashed line 2 in FIG. 3). The fuel pump 20 reaches frequency F3 at time T2 in the second mode indicated by dashed line 2.

First, the preliminary period of time t1 for which the pumping frequency is held at F1 in the first mode is shorter than the preliminary period of time t2 for which the pumping frequency is pumping frequency is held at F1 in the second mode. As the heat output rate will increase as the pumping frequency is increased, the total heat output, and hence average heat output rate, for the period ti will be lower in the second mode than in the first mode.

Second, the rate of increase of pumping frequency between F1 and F2, as indicated by the gradients of the lines between F1 and F2 in FIG. 3, is less in the second mode than in the first mode. The time taken in the second mode for the pumping frequency to reach F3 is therefore greater than in the first mode. Therefore, the overall time t3 for the pumping frequency to increase from F1 to F3 is shorter in the first mode than that, t4, in the second mode. In addition to t2 being greater than t1 for the second mode, the fact that t4 is greater than t3 also contributes to the total heat output, and hence average heat output rate for the period ti being lower in the second mode than in the first mode.

Dashed lines 3 and 4 in FIG. 3 indicate the second mode of operation in alternative embodiments of the invention. The fuel pump 20 reaches frequency F2 at time T3 in the alternative embodiment indicated by dashed line 3 and at time T4 in the alternative embodiment indicated by dashed line 4.

In these alternative embodiments, the preliminary time period t5 for which the pumping frequency is held at F1 is even longer than the preliminary time period t2 in the embodiment illustrated by dashed line 2.

In addition, in both of these alternative embodiments, the time taken, t6 and t7 for dashed lines 3 and 4, respectively, for the pump frequency to increase from F1 to F3 is longer than the time t4 in the embodiment illustrated by dashed line 2. Further, t7 is longer than t6, as a result of the time taken to reach F2 being greater for the embodiment illustrated by dashed line 4.

Therefore, dashed lines 3 and 4 illustrate second mode pumping frequency profiles which result in lower average heat output over ti than the profile illustrated by dashed line 2. Further, line 4 illustrates a second mode pumping frequency profile which results in a lower average heat output over ti than the profile of line 3.

The pump frequency profiles may be stored in a memory device in a control unit 13.

In use the fuel operated heater system to may be operated in one of two or more modes of operation wherein in at least one mode the fuel operated heater system 10 initially starts in a low heat output or slow heat mode the since the viscosity of the coolant fluid at start-up of the fuel operated heater 18 may be sufficiently high that the auxiliary coolant pump 15 cannot provide sufficient flow rate to prevent localised overheating of the coolant fluid in the region of the heat exchanger 19 of the fuel operated heater 18.

In some embodiments, once a heating profile or start-up sequence has commenced, the system 10 is able to generate and/or receive an error signal at 118 (see FIG. 4), which error signal is received at the control unit 13. The error signal is indicative that the fluid is being, or is lively to be, overheated by the fuel operated heater 18 in the region of heat transfer in the heat exchanger 19. Therefore, the error signal may be generated as following determination of the flow capability of the fluid according to step 116b (FIG. 4). Upon receipt of the error signal the control unit 13 will initiate at step 120 (FIG. 4) a new heating profile or start-up sequence of the fuel operated heater 18 which is different to that in current use. The new start-up sequence will be such that heat is transferred to the cooling fluid at a lower rate, to reduce the risk of overheating, and to allow the heat to be transferred to the fluid, such that viscosity is reduced, in some embodiments changing start-up mode in response to an error signal may occur in addition to selecting or determining a start-up mode according to a property indicative of coolant viscosity. In such embodiments, the control unit 13 will either select a different one of the second, slow heat, modes of operation or change from a first, rapid heat, mode to a second, slow heat, mode, depending on the mode in use when the error signal is received. In other embodiments the error signal may be used instead of monitoring a property indicative of viscosity, in order to determine when a second, slower heating rate start-up sequence in required.

Referring to FIG. 4, in another embodiment according to the invention, after a predetermined time the heater system may switch from the heating profile initially chosen at 114 to new heating profile at 120 via path 118b, thus changing the sequence without the error signal at 118. For example, the heater may start up at 114 in the low heat output mode and switch after a time to a high heat output mode at 120.

Figure 5:
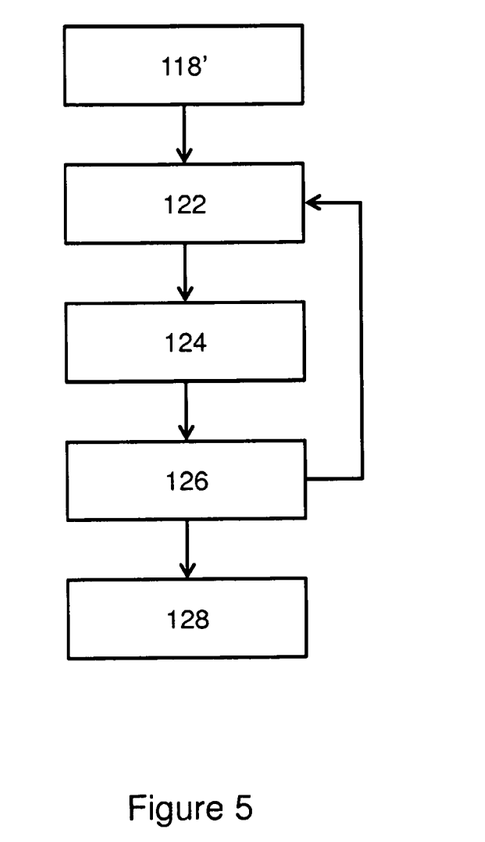
FIG. 5 is a flow diagram of a method of operating a heater system according to another embodiment of the invention.

Referring to FIG. 5, upon detection of the error code at 118', the heater system may also enter a control idle state at 122, where the heater is stopped. In the control idle state, the coolant pump 15, may pump coolant around the system. From step 122 the flow capability parameter of the fluid is measured at 124. The outcome of the parameter measurement is assessed at 126 where: if the parameter is below a pre-determined threshold, indicating that starting the heating would lead to overheating the fluid again, the heater system returns to the control idle state at 122; and if the parameter is above the predetermined threshold, a heater restart attempt will be made at step 128. In the event that the heater restart attempt falls, the heater system will return to the control idle state at 122.

It can be appreciated that various changes may be made within the scope of the present invention. For example, the coolant fluid may flow in the opposing direction, counter clockwise, to that described and illustrated, in other words the coolant fluid may pass through the HEVAC system 12 before the engine 8, in such embodiments the position of the valve 14 may be adjusted accordingly, for example to the position indicated by P1. In yet other embodiments an additional valve may be placed at position P1.

It will be appreciated that the temperature, threshold $T_e1$ which determines when the pump operates in the first or second mode and the temperature threshold $T_e2$ which determines the condition of the valve 14 may be dependent upon; the type, concentration or chemistry of the coolant being used; the type or configuration of auxiliary pump; the type or configuration of the heat exchanger in the fuel operated heater; and the type of fuel being burnt by the fuel operated heater and/or combustion engine 8. It will be appreciated that the temperature threshold $T_e1$ which determines when the pump operates in the first or second mode and the temperature threshold $T_e2$ which determines the condition of the valve 14 may be the same temperature value or may be different temperature values.

Further, in this embodiment, the temperature of the fluid is used as a parameter which is indicative of the how capability of the fluid, but it will be appreciated that other parameters may be used, for example ambient temperature, the viscosity of the fluid, or the current draw of the pump required to pump the fluid at a particular rate.

It will be appreciated that the embodiments given are examples of a number of ways in which the average heat output can be reduced in a second mode compared with a first mode over an initiation period, and it would be with the capability of the skilled person to devise other suitable second mode pumping frequency profiles which also achieve the effect of reducing heat output, so that the heat which is transferred to the cooling fluid can enable a reduction of the viscosity of the fluid and a resultant flow of cooling fluid around the cooling circuit, without overheating occurring or an error signal being received.

In the above embodiments, the heat output in the second mode has been made different to that in the first mode by changing the rate at which fuel is supplied to the combustion chamber by changing the pumping frequency of the fuel pump. It will be appreciated that the rate at which fuel is supplied to the combustion chamber may be achieved by other means, or that, the change in heat output to the cooling fluid may also be changed by other means.

In an alternative embodiment the fuel operated heater system comprises a fluidic circuit which bypasses the HEVAC system such that the fuel operated heater system can be controlled to provide heat to the engine only. This may require additional piping or conduit to form a bypass circuit omitting the HEVAC system; additional valves may also be required for directing the fluid around the bypass circuit. Alternatively the HEVAC system may be selectively omitted from the fluid path by changing the placement of valve 14 and/or fuel operated heater 18 within the fuel operated heater system. In such embodiments the fuel operated heater is used to heat the engine only in order to ensure the engines starts, this may be especially useful when the energy reserves for example in the battery are limited or reduced in capacity.

It will be recognised that as used herein, directional references such as "top", "bottom", "front", "back", "end", "side", "inner", "outer", "upper" and "lower" do not limit the respective features to such orientation.

The invention claimed is:

1. A control system for a heater of a vehicle for preheating vehicle components via fluid in a heat exchanger, the control system comprising a control unit configured, prior to starting of an engine of the vehicle:

to receive a wake signal to commence heating;

to determine, prior to commencing heating of the fluid, a parameter value indicative of a flow capability of the fluid in dependence on data received from one or more sensors;

to select, prior to commencing heating of the fluid, a heating sequence from at least two heating profile sequences in dependence on the determined parameter value indicative of the flow capability of the fluid, the at least two heating profile sequences comprising a first heating profile sequence for use when the parameter value indicates that the flow capability of the fluid is above a predetermined threshold value and a second heating profile sequence for use when the parameter value indicates that the flow capability of the fluid is below a predetermined threshold value; and to initiate the selected heating profile sequence of the heater to commence heating of the fluid, wherein the control system is configured so that, in the second heating profile sequence the heater is operated such that heat is transferred to the fluid at a lower average rate for at least an initial period than when the heater is operated according to the first heating profile sequence.

2. The control system of claim 1, wherein the control system is configured to:
determine the flow capability of the fluid by determining the parameter value after initiating the heating profile sequence, and
change the initiated heating profile sequence to another one of the at least two heating profile sequences when the initiated heating profile sequence is wrong for the determined flow capability.

3. The control system of claim 1, wherein the control system is configured to receive an error code indicating that the fluid is being overheated or will be overheated.

4. The control system of claim 1, wherein the control system is configured to:
stop the heating profile sequence;
monitor the parameter value indicative of the flow capability of the fluid;
repeating the monitoring until the parameter value reaches a pre-determined value.

5. The control system of claim 1, wherein the control system is configured to repeat initiation of the heating profile sequence to restart the heating profile sequence.

6. The control system of claim 1, wherein the control system is configured to initiate a further heating profile sequence selected from the at least two sequences, the further heating profile sequence being different than the initiated heating profile sequence.

7. The control system of claim 1, wherein the control system is configured to determine the flow capability of the fluid by measurement of at least one of the following:
the temperature of the fluid;
the temperature of ambient air; and
the viscosity of the fluid.

8. The control system of claim 1, wherein the control system is configured so that, in the second heating profile sequence the heater is operated so that heat is transferred to the fluid such that the flow capability of the fluid is increased, without overheating of the fluid.

9. The control system of claim 1, wherein the control system is configured so that, when in the second heating profile sequence the heater is operated so that the flow capability of the fluid is increased, during the initial period, such that afterwards the rate of heat transfer may be increased without overheating of the fluid.

10. The control system of claim 1, wherein the control system is configured so that, in the second heating profile sequence the heater is operated such that heat is transferred to the fluid at a rate which is sufficiently low to prevent overheating of the fluid, in the region of the heater where heat transfers to the fluid.

11. The control system of claim 1, wherein the control system is configured so that, in the second heating profile sequence, the heater generates a lower rate of heat output for a preliminary period, wherein the preliminary period is longer than the initial period.

12. The control system of claim 1, wherein the heater is a fuel operated heater comprising a fuel pump, and wherein the control system is configured to cause the fuel pump to pump fuel to the fuel operated heater at a lower average flow rate in the second sequence than in the first sequence.

13. A heater system for preheating vehicle components, the heater system comprising:
a heater arranged to heat a fluidic circuit; and
the control system according to claim 1 for controlling the heater.

14. The system according to claim 13 wherein the heater comprises a fuel operated heater, and the heater system further comprises a fuel pump in fluidic connection with a fuel tank, the fuel pump being capable of delivering fuel from the fuel tank to the heater at two or more different rates.

15. The system according to claim 13, wherein the heater system further comprises:
a fluidic circuit coupling the heater to a vehicle component to be heated;
a fluid within the fluidic circuit;
a sensor for measuring the parameter indicative of the flow capability of the fluid.

16. The system according to claim 15, wherein the component to be heated comprises at least one from an internal combustion engine for a vehicle and a HEVAC system for a vehicle.

17. The system of claim 15 wherein the sensor is a temperature sensor for determining the temperature of the fluid in the fluidic circuit.

18. The system of claim 17 wherein the temperature sensor is arranged to send a signal indicating overheating of the fluid.

19. A vehicle comprising the heater system according to claim 13.

20. A method of operating a heater for preheating components of a vehicle via a fluid in a heat exchanger, the method being operable prior to starting an engine of the vehicle, the method comprising:
a) receiving a wake signal to commence heating;
b) determining, prior to commencing heating of the fluid, a parameter value indicative of a flow capability of the fluid in dependence on data received from one or more sensors;
c) selecting, prior to commencing heating of the fluid, a heating sequence from at least two heating profile sequences in dependence on the determined parameter value indicative of the flow capability of the fluid, the at least two heating profile sequences comprising a first heating profile sequence for use when the parameter value indicates that the flow capability of the fluid is above a predetermined threshold value and a second heating profile sequence for use when the parameter value indicates that the flow capability of the fluid is below a predetermined threshold value;
d) initiating the selected heating profile sequence of the heater to commence heating of the fluid;
wherein in the second heating profile sequence the heater is operated such that heat is transferred to the fluid at a lower average rate for at least an initial period than when the heater is operated according to the first heating profile sequence.

21. The method according to claim 20 wherein, in the second heating profile sequence the heater is operated such that heat is transferred to the fluid at a lower average rate for at least an initial period than when the heater is operated according to the first heating profile sequence.

* * * * *